US012750237B2

(12) United States Patent
Tan et al.

(10) Patent No.: US 12,750,237 B2
(45) Date of Patent: Sep. 29, 2026

(54) METHOD AND SYSTEM FOR PROTECTING DIGITAL SIGNATURES

(71) Applicant: PQCEE PTE LTD, Singapore (SG)

(72) Inventors: Teik Guan Tan, Singapore (SG); Jianying Zhou, Singapore (SG)

(73) Assignee: PQCEE PTE LTD, Singapore (SG)

( * ) Notice: Subject to any disclaimer, the term of this patent is extended or adjusted under 35 U.S.C. 154(b) by 0 days.

(21) Appl. No.: 18/700,993

(22) PCT Filed: Oct. 26, 2022

(86) PCT No.: PCT/SG2022/050769
§ 371 (c)(1),
(2) Date: Apr. 12, 2024

(87) PCT Pub. No.: WO2023/080842
PCT Pub. Date: May 11, 2023

(65) Prior Publication Data
US 2024/0422010 A1 Dec. 19, 2024

(30) Foreign Application Priority Data
Nov. 5, 2021 (SG) ............................ 10202112269T

(51) Int. Cl.
*H04L 9/32* (2006.01)

(52) U.S. Cl.
CPC .......... *H04L 9/3247* (2013.01); *H04L 9/3218* (2013.01)

(58) Field of Classification Search
CPC ... H04L 9/3247; H04L 9/3218; H04L 9/3252; H04L 9/3297; H04L 63/123; H04L 63/126; H04L 9/0825; H04W 12/35
See application file for complete search history.

(56) References Cited

U.S. PATENT DOCUMENTS 10,846,372 B1 * 11/2020 Jayachandran ....... H04L 9/3239
2017/0358161 A1 * 12/2017 Hao ....................... G07C 13/02
(Continued)

FOREIGN PATENT DOCUMENTS

WO 2021102443 A1 5/2021

OTHER PUBLICATIONS

International Search Report and Written Opinion for Application No. PCT/SG2022/050769, dated Jun. 5, 2023, 9 pages.
(Continued)

*Primary Examiner* — Anh Nguyen
(74) *Attorney, Agent, or Firm* — Baker Donelson; Carl M. Davis, II

(57) ABSTRACT

A method for quantum-resistant digitally signing data, a method for verification of a quantum resistant digital signature for authentication of a source of data by verifying a private key, and a quantum resistant digital signature system are provided. The quantum resistant digital signature system includes a digital signature system and a layer of quantum resistant protection. The digital signature system includes a public key and a private key, wherein the public key is associated with the private key. The digital signature system also includes a digital signature generated in response to data and the private key. The layer of quantum resistant protection is applied to the digital signature system and includes a signing-party-provided quantum-secure proof of knowledge of a pre-image of the private key.

16 Claims, 5 Drawing Sheets

Algorithm 1: Quantum-resistant ECDSA Key Generation $KeyGen_q$.

begin
  $G \leftarrow$ ECC base point; $P \leftarrow$ ECC order;
  Generate secret pre-image $\rho$;
  Compute private key $K_s = H(\rho)$; 110
  Compute public key $K_p = (x, y)$ where $K_p \equiv K_s \cdot G \ mod \ P$;
  destroy $K_s$;
  return $\rho$, $K_p$;
end

100

(56) References Cited

U.S. PATENT DOCUMENTS

| | | | | |
|---|---|---|---|---|
| 2021/0297255 | A1 | 9/2021 | Wan et al. | |
| 2023/0291561 | A1* | 9/2023 | Trock | H04L 9/3213 |
| 2023/0318840 | A1* | 10/2023 | Zhandry | H04L 9/3236 713/189 |
| 2023/0327884 | A1* | 10/2023 | Verheul | H04L 9/0866 713/168 |

OTHER PUBLICATIONS

Tan, T.G. et al. A Survey of Digital Signing in the Post Quantum Era, Dec. 1, 2019 (Retrieved on Apr. 5, 2024 from https://eprint.iacr.org/archive/2019/1374/20191201:205800).

Bindel Nina et al, "Transitioning to a Quantum-Resistant Public Key Infrastructure", Jun. 4, 2017, Post-Quantum Cryptography; [Lecture Notes in Computer Science; Lect. Notes Computer], Springer International Publishing, Cham, pp. 384-405, XP047694261, ISSN: 0302-9743, ISBN: 978-3-319-59878-9.

David Chaum et al, "W-OTS+ up my Sleeve! A Hidden Secure Fallback for Cryptocurrency Wallets", IACR, International Association for Cryptologic Research, vo. 20210629: 133155, Jun. 29, 2021, pp. 1-28, XP061059638, retrieved from the Internet: URL: https://eprint.iacr.org/2021/872.pdf.

Dustin Moody et al, "Status report on the second round of the NIST post-quantum cryptography standardization process NIST IR 8309", Jul. 22, 2020, pp. 1-39, XP061056310, DOI: 10.6028/NIST.IR.8309, retrieved from the internet: URL: https://nvlpubs.nist.gov/nistpubs/ir/2020/NIST.IR.8309.pdf.

European Patent Office, "Supplementary European Search Report", EP 22890531.1, Jul. 14, 2025.

Zhandry, Mark; "Notes For Lecture 13, COS 697A: Quantum Cryptography", Princeton University; Nov. 2018.

Intellectual Property Office of Singapore, "Written Opinion", Singapore patent application 11202402379T, Method And System For Protecting Digital Signatures, Jun. 4, 2026.

* cited by examiner

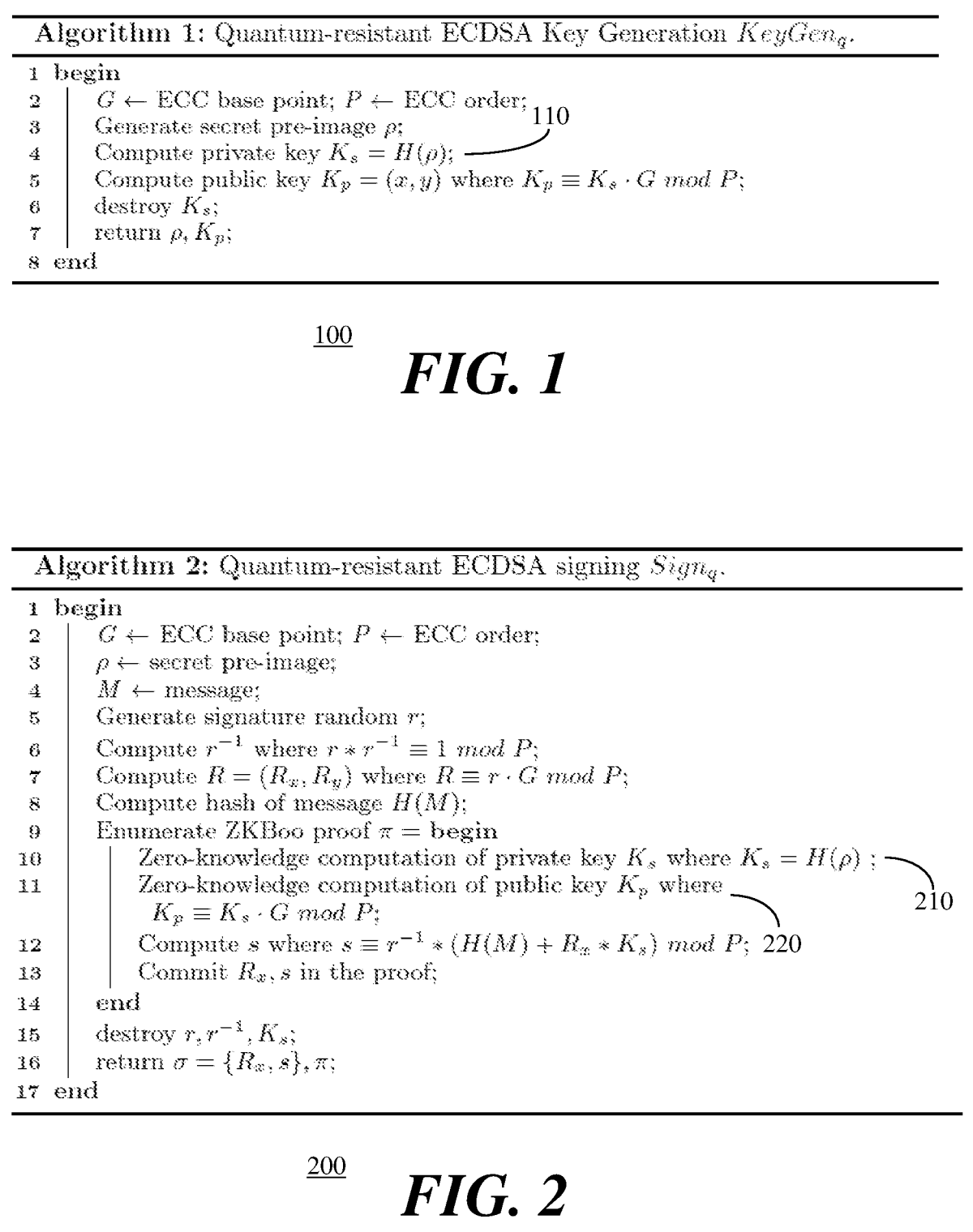

Algorithm 1: Quantum-resistant ECDSA Key Generation $KeyGen_q$.

begin
- $G \leftarrow$ ECC base point; $P \leftarrow$ ECC order;
- Generate secret pre-image $\rho$;
- Compute private key $K_s = H(\rho)$; 110
- Compute public key $K_p = (x, y)$ where $K_p \equiv K_s \cdot G \ mod \ P$;
- destroy $K_s$;
- return $\rho, K_p$;

end

100

FIG. 1

Algorithm 2: Quantum-resistant ECDSA signing $Sign_q$.

begin
- $G \leftarrow$ ECC base point; $P \leftarrow$ ECC order;
- $\rho \leftarrow$ secret pre-image;
- $M \leftarrow$ message;
- Generate signature random $r$;
- Compute $r^{-1}$ where $r * r^{-1} \equiv 1 \ mod \ P$;
- Compute $R = (R_x, R_y)$ where $R \equiv r \cdot G \ mod \ P$;
- Compute hash of message $H(M)$;
- Enumerate ZKBoo proof $\pi =$ begin
  - Zero-knowledge computation of private key $K_s$ where $K_s = H(\rho)$ ; 210
  - Zero-knowledge computation of public key $K_p$ where $K_p \equiv K_s \cdot G \ mod \ P$;
  - Compute $s$ where $s \equiv r^{-1} * (H(M) + R_x * K_s) \ mod \ P$; 220
  - Commit $R_x, s$ in the proof;
- end
- destroy $r, r^{-1}, K_s$;
- return $\sigma = \{R_x, s\}, \pi$;

end

200

FIG. 2

Algorithm 3: Quantum-resistant ECDSA verification $Verify_q$.

```
begin
    G ← ECC base point; P ← ECC order;
    K_p ← ECC public key;
    R_x, s ← signature σ; π ← proof; M ← message;
    Compute s^-1 where s * s^-1 ≡ 1 mod P;
    Compute hash of message H(M);
    Compute u_1 = s^-1 * H(M) mod P;
    Compute u_2 = s^-1 * R_x mod P;
    Compute V = (V_x, V_y) where V = u_1 · G + u_2 · K_p mod P;
    if V_x ≠ R_x then
        return "Failed Signature Verification"
    end
    else
        Verify ZKBoo proof π = begin
            Check that R_x, s is committed in the proof;
            Check that zero-knowledge computation of K_p from unknown
              pre-image is correct;
            if Check Failed then
                return "Failed Proof Verification"
            end
        end
    end
    return success;
end
```

310 (lines 5–12)

320 (lines 14–20)

300

FIG. 3

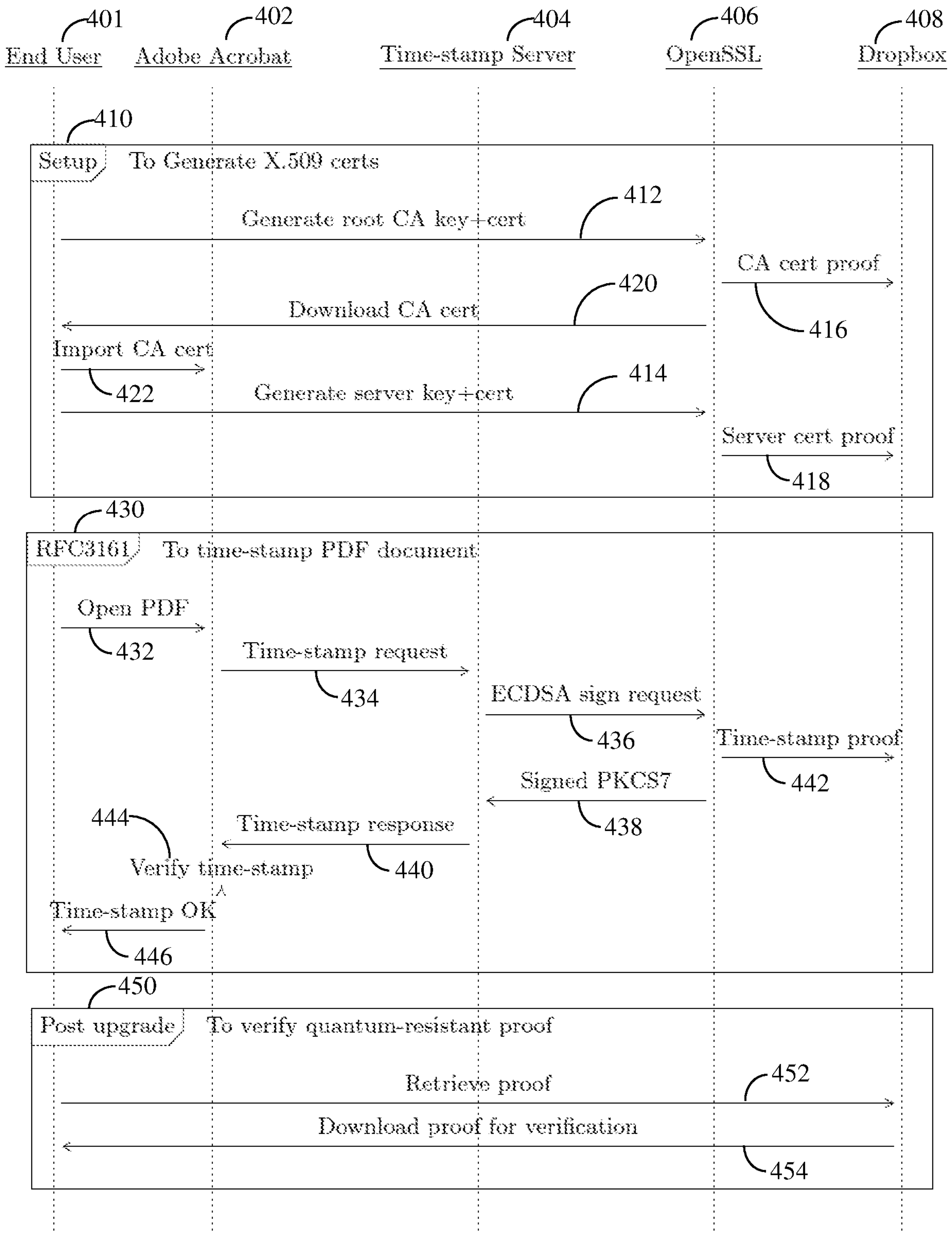
400 *FIG. 4*

500

600

METHOD AND SYSTEM FOR PROTECTING DIGITAL SIGNATURES

PRIORITY CLAIM

This application claims priority from Singapore Patent Application No. 10202112269T filed on 5 Nov. 2021.

TECHNICAL FIELD

The present invention generally relates to digital signatures, and more particularly relates to methods and systems for protecting digital signatures against quantum-capable adversaries.

BACKGROUND OF THE DISCLOSURE

Asymmetric key cryptography is a tool used by systems worldwide to preserve trust amongst parties in the digital realm. The use of digital signatures allows communicating parties to authenticate each other, check the integrity of the data exchanged, and prove the origin of the data in situations of repudiation. Three classical digital signature algorithms are described under National Institute of Standards and Technology's (NIST) Digital Signature Standards and include a Digital Signature Algorithms (DSA) which is based on discrete logarithm cryptography, a Rivest-Shamir Adelman (RSA) algorithm, and an Elliptic-Curve Digital Signature Algorithm (ECDSA), ECDSA being based on Elliptic Curve Cryptography (ECC). The security of DSA and ECDSA are based on solving a discrete logarithm over a finite field of very large numbers, while the security of RSA is based on the difficulty of integer factorization over a finite field of very large numbers.

However, the advent of large fault-tolerant quantum computers has created a big risk to systems that use these classical digital signature algorithms. Shor's algorithm has the ability to solve both the discrete logarithm problem on which DSA and ECDSA are based and the integer factorization problem on which RSA is based in O(log N) polynomial time. This means that any adversary in possession of a large-enough quantum computer is able to compute a user's private signing key when given the user's public key in a matter of hours and, thereby, generate valid digital signatures to impersonate the user. In addition, data that was previously signed by the user can no longer be proven to be authentic and trustworthy.

While the industry is likely to encourage new system implementations to consider as new digital signature standards evolve, the challenges for existing or upcoming systems raise the following questions specific to digital signatures: How can documents that are already digitally signed remain trustworthy in the face of quantum computer digital signature defeating capabilities? Do these documents need to be counter-signed with new algorithms? Since the counter-signer may be a non-interested third party to the transaction, what liability does the counter-signer bear for the verifying party? How about legacy systems that cannot be migrated? When are the verifying parties expected to be ready to verify new algorithms? What are the legal implications for the verifying party if the existing non-quantum-secure signature passes verification, but the verifying party is unable to verify the new quantum-secure signature? Should system operators using digital signatures embark on a cryptographic migration to stateful hash-based signatures instead of waiting for industry standardization?

There is, therefore, a need for systems and methods for digital signatures which overcome the drawbacks of present digital signature systems and protect digital signatures against quantum-capable adversaries. Furthermore, other desirable features and characteristics will become apparent from the subsequent detailed description and the appended claims, taken in conjunction with the accompanying drawings and this background of the disclosure.

SUMMARY

According to at least one aspect of the present embodiments, a quantum resistant digital signature system is provided. The quantum resistant digital signature system includes a digital signature system and a layer of quantum resistant protection. The digital signature system includes a public key and a private key, wherein the public key is associated with the private key. The digital signature system also includes a digital signature generated in response to data and the private key. The layer of quantum resistant protection is applied to the digital signature system and includes a signing-party-provided quantum-secure proof of knowledge of a pre-image of the private key.

According to another aspect of the present embodiments, a method for quantum-resistant digitally signing data is provided. The method generating a public key and a pre-image parameter in response to a security parameter and generating a private key, wherein the private key is generated in response to the pre-image parameter and is associated with the public key. The method further includes generating a signature in response to the data and the private key, generating a proof of knowledge of the pre-image parameter, and digitally signing the data with both the signature and the proof of knowledge of the pre-image parameter.

According to a further aspect of the present embodiments, a method for verification of a quantum resistant digital signature for authentication of a source of data by verifying a private key is provided. The method includes authenticating the source of the data by verifying using both a public key associated with the private key and a proof of knowledge of a pre-image parameter to verify a digital signature corresponding to the data is generated in response to the private key.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with present embodiments.

FIG. 1 depicts an exemplary quantum-resistant ECDSA key generation algorithm $KeyGen_q$ in accordance with the present embodiments.

FIG. 2 depicts an exemplary quantum-resistant ECDSA signing algorithm $Sign_q$ in accordance with the present embodiments.

FIG. 3 depicts an exemplary quantum-resistant ECDSA verification algorithm $Verify_q$ in accordance with the present embodiments.

FIG. 4 depicts a process diagram illustrating use-cases of a real-life implementation of the quantum-resistant digital signature scheme in accordance with the present embodiments under test.

Figure 5:
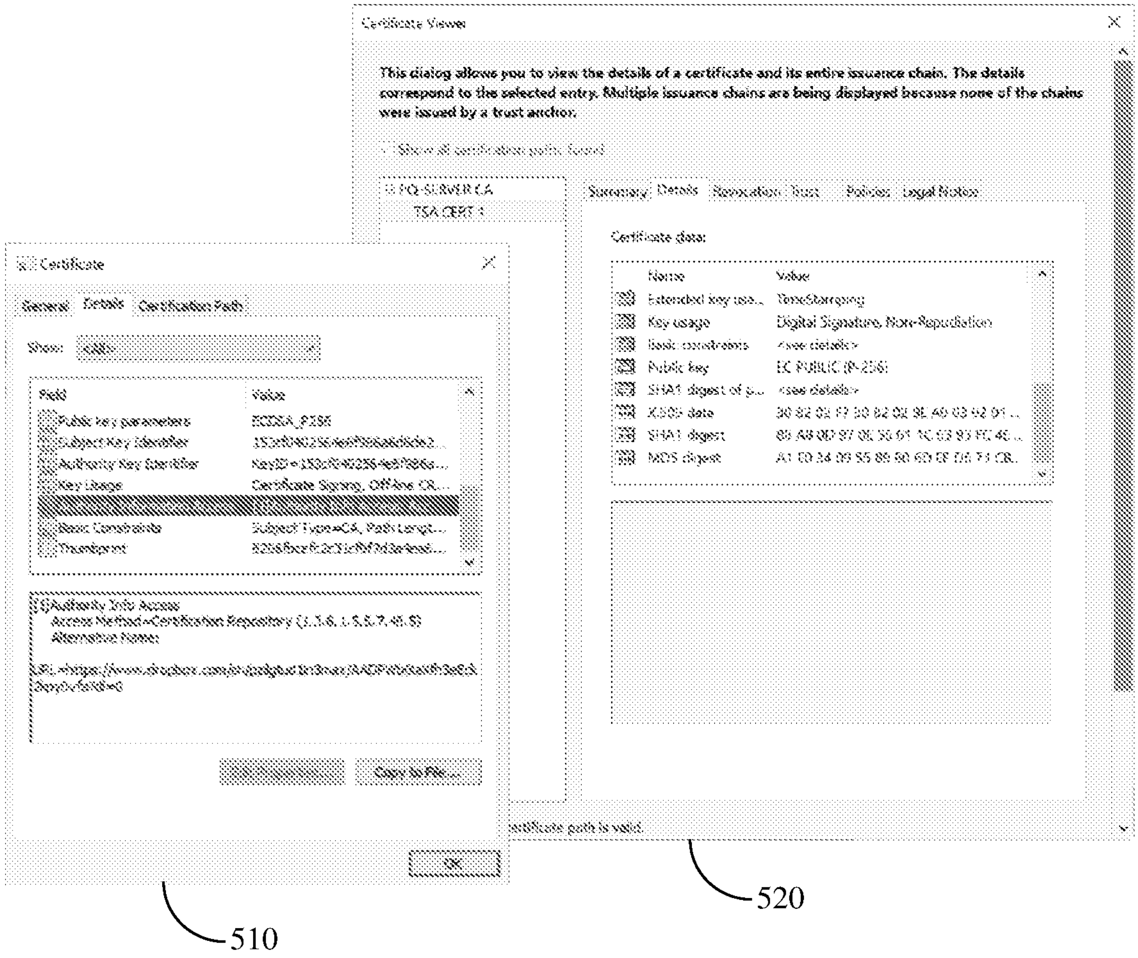
FIG. 5 depicts images of windows exemplifying the predefined certificate hierarchy in the real-life implementation of the quantum-resistant digital signature scheme in accordance with the present embodiments.

Skilled artisans will appreciate that elements in the figures are illustrated for simplicity and clarity and have not necessarily been depicted to scale.

DETAILED DESCRIPTION

The following detailed description is merely exemplary in nature and is not intended to limit the invention or the application and uses of the invention. Furthermore, there is no intention to be bound by any theory presented in the preceding background of the disclosure or the following detailed description. It is the intent of present embodiments to present a novel means of adding a layer of quantum-resistant protection for systems using RSA/DSA/ECDSA and other digital signature algorithms which may otherwise be vulnerable to adversaries using quantum computers. In accordance with the present embodiments, the use of a quantum-secure zero-knowledge proof is applied to require the signing party to include the proof that the private key was indeed generated by the signing party and not crypt-analyzed using a quantum computer. This is achieved in accordance with the methods and systems of the present embodiments by the signing party including during the signing process a quantum-secure zero-knowledge proof of knowledge of the pre-image of the private key, together with the digital signature generated from the private key, when digitally signing a message to be sent to the verifying party. In this manner, the present embodiments enable systems that use RSA/DSA/ECDSA and other digital signature algorithms to advantageously achieve protection against quantum computers while maintaining backward compatibility with existing verifying party implementations and legislature that recognize the use of digital signatures.

The methods and systems in accordance with the present embodiments are formed on the premise that if the existing digital signatures can remain quantum-resistant even after large-enough quantum computers are built, then many transition-related backward-compatibility issues can be avoided. Migration timelines to new algorithms will be less counterparty dependent and existing digitally signed documents advantageously retain their authenticity in the post-quantum era. The present embodiments advantageously prevent existing systems from facing compatibility issues by layering a quantum-secure zero-knowledge proof of a pre-image of a private signing key along with the signature resulting in the technical effects of (a) extending the digital signature scheme to construct a quantum-resistant digital signature scheme with backward-compatibility properties, (b) realizing the quantum-resistant digital signature scheme using a zero-knowledge proof to be included with digital signatures to make the digital signatures quantum-resistant, (c) deploying a real-world implementation including an Adobe® PDF digital signature solution which provides a RFC3161-compatible time-stamp server to issue quantum-resistant ECDSA timestamp digital signatures with X.509v3 certificates that are compatible with existing Adobe PDF Acrobat Reader DC v2021.x.

A digital signature provides integrity, authenticity and non-repudiation in digital communications. As an example, Alice and Bob are communicating parties. Alice has a message M to be sent to Bob and wants to ensure that Bob receives the message unchanged (integrity) and knows that it is from Alice (authenticity). Bob wants to be able to prove to a third-party that the message is indeed from Alice (non-repudiation).

A digital signature scheme is defined as a triple of polynomial-time algorithms KeyGen, Sign, and Verify. The algorithm KeyGen takes in a security parameter $1^n$ which defines a cryptographic key strength of a predetermined strength n, and outputs a private key $K_s$ and a corresponding public key $K_p$. The algorithm Sign takes in a message M and the private key $K_s$, and outputs a signature $\sigma$. And the algorithm Verify takes in a message M, the public key $K_p$ and the signature $\sigma$ and outputs 'accept' if and only if $\sigma$ is a valid signature generated by Sign(M, $K_s$). These relationships are shown in Equations (1), (2) and (3).

$$KeyGen(1^n) \Rightarrow \{K_s, K_p\} \tag{1}$$

$$\text{Sign}(M, K_s) \Rightarrow \{\sigma\} \tag{2}$$

$$\text{Verify}(M, K_p, \sigma) \Rightarrow \{\text{result}\} \tag{3}$$

In the example of Alice and Bob, Alice, the signing party, calls KeyGen to generate $\{K_s, K_p\}$. $K_p$ is published providing Bob and other parties access to $K_p$. Alice then calls Sign with her private key $K_s$ to sign the message M, generating a signature $\sigma$. Alice transmits $\{M, \sigma\}$ to Bob. Bob, the verifying party, calls Verify with Alice's public key $K_p$ to verify the signature $\sigma$ for message M. If Verify returns 'accept', then Bob has successfully received a message M unchanged and the signature proof $\sigma$ from Alice.

A zero-knowledge proof is defined as a proof which conveys no additional knowledge besides the correctness of the proposition. While there has been many concrete realizations of zero-knowledge proofs, quantum-resistant non-interactive zero-knowledge proofs are either ZKStark based proofs or MPC-in-the-head (Multi-party computation in-the-head) based proofs. A partial-knowledge proof is a proof which conveys some knowledge in addition to the correctness of the proposition.

For MPC-in-the-head proofs, a prover must create a Boolean computational circuit of n branches with commitment, of which n−1 views can be revealed to the verifier as proof of knowledge. To make the proof non-interactive, the prover can use Fiat-Shamir's heuristic to deterministically, yet unpredictably, decide which n−1 views to send to the verifier. The verifier then walks through the n−1 views with a 1/n chance that the proposition is incorrect. By increasing the number of rounds (with different random input parameters) for which the prover has to compute the circuit and provide the views, the statistical probability that the prover is making a false claim is exponentially reduced.

Since Shor's algorithm on quantum computers breaks the integer factorization problem, the discrete logarithm problem, and the elliptic-curve discrete logarithm problem, it can safely be assumed that adversaries can feasibly compute all RSA/DSA/ECDSA private keys $K_s$ given a public key $K_p$ when large enough quantum computers are built. However, symmetric key and hash-based cryptography remain relatively quantum-resistant. For example, Grover's algorithm on quantum computers can only achieve a quadratic speedup of $O(\sqrt{N})$ when performing a brute-force search, and this has been proven to be optimal.

Therefore, in accordance with the present embodiments the signing process is extended to layer in a zero-knowledge proof of knowledge of the pre-image of the private key to protect the signature. The extended verifying process can then verify this proof to ascertain that the signature is genuinely created by the owner of the private key and not a quantum-capable adversary. For backward-compatibility, the existing verifying process can still verify the digital signature without the proof, albeit losing the quantum-resistant assurance.

To implement the advantageous solutions in accordance with the present embodiments, the triple polynomial-time algorithms of the classical digital signature scheme (i.e., Equations (1), 2) and (3)) are extended. The extended quantum-resistant digital signature scheme in accordance with the present embodiments is defined as a triple of polynomial-time algorithms $KeyGen_q$, $Sign_q$, and $Verify_q$. The algorithm $KeyGen_q$ takes in the security parameter $1^n$ which defines the cryptographic key strength of n and outputs a secret pre-image parameter, pre-image ρ, and a public key $K_p$. $K_p$ is an associated public key to a private key H(ρ) where H( ) the computation of the private key, is a collapsing hash function. The algorithm $Sign_q$ takes in a message M and the secret pre-image ρ, and outputs a signature σ computed using Sign(M, H(ρ)) as well as a quantum-resistant zero-knowledge proof π where H(ρ) is computed from ρ, σ is computed from H(ρ), and the quantum-resistant zero-knowledge proof π is generated in response to at least a portion of the private key H(ρ). The private key H(ρ) may be generated by performing a hash key derivation on the pre-image ρ, performing a one-way function key derivation on the pre-image ρ, or performing a symmetric key derivation on the pre-image ρ. As the public key $K_p$ is associated with the private key H(ρ), the public key $K_p$ may also be generated by performing a hash key derivation on the pre-image ρ, performing a one-way function key derivation on the pre-image ρ, or performing a symmetric key derivation on the pre-image ρ.

For verification, the algorithm $Verify_q$ takes in a message M, the public key $K_p$ and signature σ and outputs 'accept' to authenticate the source of the message M if and only if Verify(M, $K_p$) returns accept and π is a valid zero-knowledge proof of knowledge that σ is computed from ρ. These relationships are shown in Equations (4), (5) and (6).

$$KeyGen_q(1^n) \Rightarrow \{\rho, K_p\} \quad (4)$$

$$\text{Sign}_q(M, \rho) \Rightarrow \{\sigma, \pi\} \quad (5)$$

$$\text{Verify}_q(M, K_p, \sigma, \pi) \Rightarrow \{\text{result}\} \quad (6)$$

Intuitively, the digital signature scheme in accordance with the present embodiments inherits the classical security properties of the classical digital signature scheme with an additional layer of quantum-resistance placed on the private key. A classical adversary will not be able to compromise the soundness of $Verify_q$ when interacting with the signing party since the additional information obtained from $Sign_q$ is a zero-knowledge proof that does not reveal the secret pre-image ρ or the private key $K_s$=H(ρ).

Thus, it can be seen that the quantum-resistant digital signature scheme in accordance with the present embodiments advantageously offers additional quantum-resistance for digital signatures generated using $Sign_q$, provided $Verify_q$ is used to verify the signature σ and the proof π, wherein the proof π is a signing-party-provided quantum-secure proof of knowledge of the pre-image ρ of the private key and, hence, the proof π, being accessible by the verifier, is used to quantum-securely prove that the digital signature σ is computed from ρ.

The additional quantum resistance for the digital signature scheme in accordance with the present embodiments can be shown by assuming that a quantum-capable adversary is able to use Shor's algorithm to recover H(ρ) from $K_p$. Using H(ρ), the adversary is able to arbitrarily generate valid signatures σ using Sign which will be accepted by Verify. However, the adversary will not be able generate the proof π since the value of the signature ρ is not recoverable from computation of the private key H(ρ) as H( ) is a collapsing hash function and resistant to pre-image attacks, even from quantum computers. Thus, $Verify_q$ is resistant to quantum-capable adversaries.

In addition, it can be seen that a signing party using $KeyGen_q$ and $Sign_q$ of the digital signature scheme in accordance with the present embodiments advantageously generates signatures σ that are backward compatible with verifying parties using the Verify algorithm of classical digital signature schemes.

The backward compatibility for the quantum-resistant digital signature scheme in accordance with the present embodiments is evidenced by the fact that the signatures σ returned by $Sign_q$ are generated using the same algorithm Sign where H(ρ) is effectively equal to $K_s$. Hence, any verifying party using Verify will be able to ignore π and continue to call Verify to check the validity of the signature σ with respect to M and $K_p$.

Thus, it can be seen that a digital signing algorithm, a hash function and a zero-knowledge proof system are included to realize the quantum-resistant digital signature scheme in accordance with the present embodiments.

Either DSA or ECDSA can be easily used as the digital signing algorithm for the quantum-resistant digital signature scheme in accordance with the present embodiments. This is because the private key generator for DSA and ECDSA is essentially an unpredictable random number generated over a finite field which advantageously matches nicely with the output of a one-way hash function H( ) Using RSA as the signing algorithm is more complex and tedious since key generation involves the matching the output of a hash function to two or more unpredictable prime numbers used to compute the RSA modulus. Possible techniques include mapping the hash output into an ordered list of very large prime numbers or repeatedly hashing (or mining) random numbers till a prime number is found. For a simpler implementation, ECDSA is used as it has the smallest key size which translates to the smallest proof size and a possible curve to be chosen may be secp256r1 (or prime256v1) which is used for the implementation examples herein.

A hash function to be used in accordance with the present embodiments and which is used for the implementation examples herein is SHA-256 as it is collapsing and the output fits well with the secp256r1 curve.

The zero-knowledge proof system to be used in the quantum-resistant digital signature scheme in accordance with the present embodiments has to be post-quantum secure. One such zero-knowledge proof system is ZKBoo as it is a three-branch MPC-in-the-head realization and already has a ready SHA-256 implementation. Thus, ZKBoo is utilized as the zero-knowledge proof system for the implementation examples herein.

Referring to FIG. 1, an exemplary quantum-resistant ECDSA key generation algorithm $KeyGen_q$ 100 in accordance with the present embodiments is shown. The key generation algorithm $KeyGen_q$ 100 functions very similarly to KeyGen except for an additional step 110 (see Step 4) which is performed to hash the secret pre-image ρ prior to computing public key $K_p$.

Referring to FIG. 2, an exemplary quantum-resistant ECDSA signing algorithm $Sign_q$ 200 in accordance with the present embodiments is shown. Besides computing the ECDSA signature using the private key H(ρ), the $Sign_q$ function returns the ZKBoo proof π which includes the zero-knowledge proof of knowledge of the pre-image of H(ρ), the zero-knowledge proof that the public key $K_p$ is computed from H(ρ), and the commitment that H(M) is the message being signed.

The implementation in accordance with the present embodiments at a step 210 (step 10) uses Giacomelli's SHA-256 code. Special care has to be taken to code the next step 220 (step 11), as the number of computational steps in the proof π could reveal the private key $K_s$. For example, when computing the public key $K_p$ after the private key $K_s$ has been generated, the equation for elliptic curve cryptography (ECC) is $K_p = K_s \cdot G \bmod P$, where G is a known base point on the elliptic curve and P is the order of the curve. Under normal computations, G will be dot-product multiplied by $K_s$ times. As $K_s$ is a value between 1 to $2^{256}$ and a bit shift method is used for multiplication, between 1 to 256 dot-product multiplications will need to be performed to get $K_p$. Under the MPC-in-the-head zero-knowledge proof, the number of gates in the circuit needed to compute $K_p$ will be shown in the proof which means that the value of $K_s$ will be revealed if someone analyses the size of the proof circuit. Hence, in accordance with the present embodiments and to advantageously further shield/hide the value of the private key $K_s$, a circuit is created that performs a predefined number of dot-product multiplications regardless of the value of $K_s$ so that the number of circuits in the public key computation remains static. In the present implementation, since the elliptic curve is the secp256r1 curve, the predefined number of computations is 256. Further, when performing elliptic-curve multiplication, the Montgomery ladder double-and-add always technique is advantageously implemented to add a further level of security and prevent timing and power side-channel attacks, i.e., where an attacker measures the time or power consumption when computing the public key from the private key.

Referring to FIG. 3, an exemplary quantum-resistant ECDSA verification algorithm $Verify_q$ 300 in accordance with the present embodiments is shown.

The quantum-resistant ECDSA verification algorithm $Verify_q$ 300 consists of two parts where the first part 310 (from step 5 to step 12) is the ECDSA signature verification similar to Verify while the second part 320 (from step 14 to step 20) is the additional verification of the quantum-resistant zero-knowledge proof in accordance with the present embodiments.

The exemplary implementation of the quantum-resistant digital signature scheme in accordance with the present embodiments was implemented in C and was tested on an Intel I5-8250U 8th Gen machine with 8 CPU cores and 8 GB RAM running a Cygwin terminal on 64-bit Microsoft Windows 10. No operating system level CPU scheduling or adjustments were done. The execution times of $Sign_q$ and $Verify_q$ were measured as well as the proof sizes when the number of ZKBoo rounds were varied from 50 to 250 in increments of 50. Increasing the number of rounds increases the bit-strength of the proof, but inadvertently also increases the proof sizes and execution times as shown in Table 1.

TABLE 1

| ZKBoo Rounds | 50 | 100 | 150 | 200 | 250 |
|---|---|---|---|---|---|
| Size of Proof (in KBytes) | 1,978 | 3,956 | 5,934 | 7,912 | 9,890 |
| $Sign_q$ Execution Time (in seconds) | 20.9 | 45.9 | 72.9 | 95.1 | 118.2 |
| $Verify_q$ Execution Time (in seconds) | 19.6 | 45.0 | 71.0 | 93.2 | 115.7 |

At first glance, the measured overheads for a 250-bit strength proof show a very large proof of about 10 MB in size and takes almost two minutes to either carry out $Sign_q$ or $Verify_q$. However, the real-life deployment implementation of the quantum-resistant digital signature scheme in accordance with the present embodiments discussed hereinafter is able to reduce the impact to the user experience as the proof could be generated asynchronously and stored separately from the certificate (i.e., where the proof is stored in a first digital location and the certificate is stored in a second digital location). This could advantageously enable parallel processing or asynchronous verification to additionally reduce the impact to the user experience.

To study issues related to backward-compatibility and migration to quantum-resistance, the quantum-resistant digital signature scheme in accordance with the present embodiments was deployed into a time-stamp server while using an existing (unchanged) Adobe Acrobat Reader DC to request for quantum-resistant time-stamped signed PDFs as a real-life deployment implementation of the quantum-resistant digital signature scheme. The deployment was carried out on a laptop with an Intel I5-8250U 8th Gen machine with 8 CPU cores and 8 GB RAM running 64-bit Microsoft Windows 10 for both the client and server. The setup included a time-stamp client and a time-stamp server. For the time-stamp client, an Adobe Acrobat Reader DC v2021.x was used as this client already supports ECDSA and was able to be used unmodified. For the time-stamp server an open-source time-stamp server by Pierre-Francois Carpentier (from https://github.com/kakwa/uts-server) was used with codes unmodified.

For a cryptographic library, the time-stamp server makes use of OpenSSL v1.1.x to carry out the operations of Certification Authority (CA) issuance of server certificates as well as to carry out digital signing according to RFC3161. The version of OpenSSL v1.1.1b was modified to carry out the extended digital signature scheme for both X.509 certificate issuance and time-stamping. An optimization was done to make OpenSSL return the ECDSA signature while generating the ZKBoo proofs asynchronously. This allowed the ECDSA-signed time-stamp to be returned to the client without waiting for the ZKBoo proof to be completely generated. Therefore, the proofs were stored separately from the certificate.

Since the quantum-resistant 256-round ZKBoo proofs for the certificates and time-stamps were 10 MBytes each, they could not be easily transmitted to the client. Thus, the modified version of OpenSSL wrote the proofs into Dropbox (www.dropbox.com), while embedding the URL link in the signed X.509 certificate or the PKCS #7 time-stamp that was returned to the calling program.

Referring to FIG. 4, a process diagram 400 illustrates use-cases of the real-life implementation the quantum-resistant digital signature scheme in accordance with the present embodiments under test. As indicated above, the implementation enabled an end user 401 to use an Adobe Acrobat reader 402 as a time-stamp client. The implementation also included a time-stamp server 404 which used OpenSSL 406 for certificate issuance and time-stamping, the OpenSSL 406 writing the proofs into Dropbox 408.

In the setup phase 410, which is only done once, OpenSSL 406 is used to generate 412 the key and certificate for the root CA certificate and is used to generate 414 the key and certificate for the time-stamp server certificate. A certificate hierarchy, defined in accordance with the present embodiments, is adopted where the root CA will certify the server certificate without the need for an intermediate CA as shown in windows 510, 520 in an image 500 of FIG. 5. Both certificates include a link 416, 418 under the X.509 Authority-Information-Access extension as digital storage location information to point to the quantum-resistant proof in Dropbox 408. In operation, the digital storage location could be a certification authority or a public repository accessible by the verifier using the digital storage location information. The root CA certificate is downloaded 420 to the end user 401 and then imported 422 into the Adobe Acrobat 402 to establish the root-to-trust.

Figure 6:
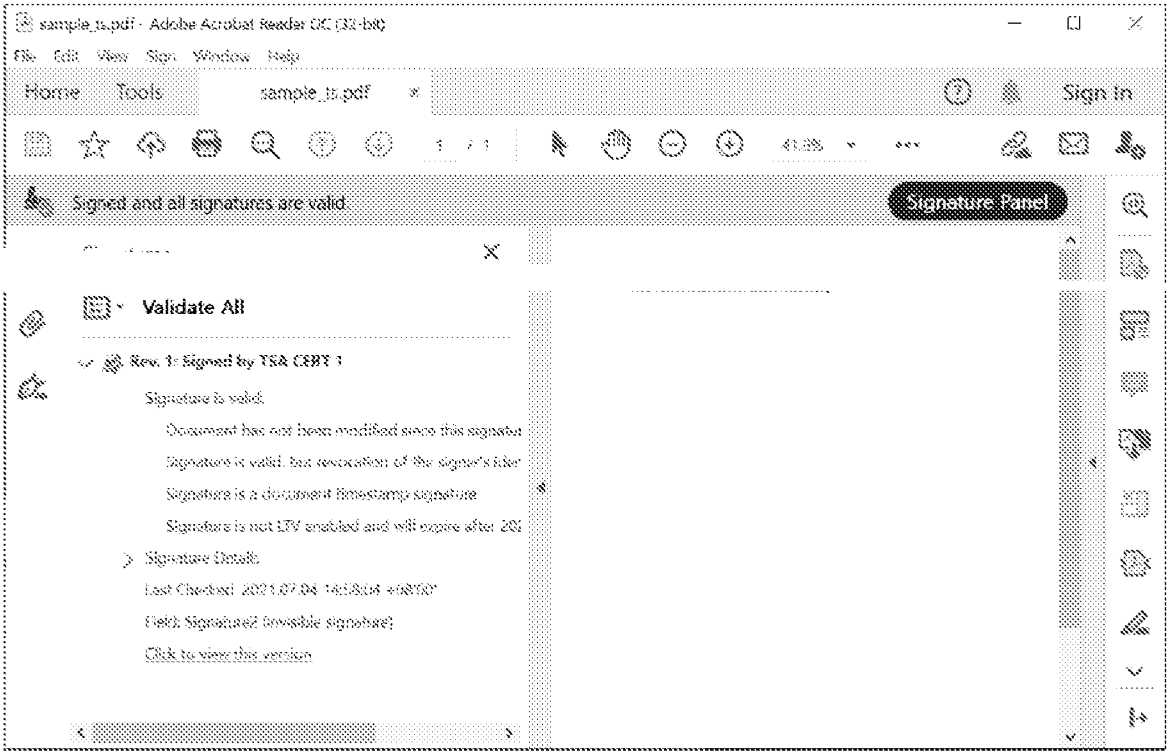
FIG. 6 depicts an image of a window exemplifying verification by the time-stamp client in the real-life implementation of the quantum-resistant digital signature scheme in accordance with the present embodiments.

In the RFC3161 phase 430, PDF documents can be timestamped after opening 432 the PDF by the end user 401 by initiating 434 the request from the Adobe Acrobat 402 to the Time-stamp Server 404. The time-stamp server 404 sends a request 436 to the OpenSSL 406 and receives 438 an ECDSA-signed PKCS #7 time-stamp which is provided 440 to the Adobe Acrobat 402. The time-stamp signature proof 442 is similarly stored in Dropbox 408 with the URL link embedded in the time-stamp. This time-stamp can be verified 444 by the Adobe Acrobat 402 and saved in the PDF for later authentication 446 by the end user 401. An example of the verification is shown in an image 600 in FIG. 6. Note that the unmodified Adobe Acrobat only verifies the ECDSA-signed time-stamp and certificate chain and not the ZKBoo proof, resulting in no changes in wait-time experienced by the end-user.

In the Post upgrade phase 450, any verifying party capable of running $\text{Verify}_q$ can follow 452 the link found in the certificates/signature block to download 454 the quantum-resistant proofs for complete signature verification as per the quantum-resistant ECDSA verification algorithm 300 (FIG. 3).

To understand the impact to systems which are gradually migrating to the quantum-resistant digital signature scheme, the different outcomes are listed in Table 2 for the signing and verifying parties at different stages of migration. As seen from Table 2, the appropriate migration strategy to layer in quantum-resistance in accordance with the present embodiments is to firstly upgrade the signing parties to include the quantum-resistant proof with the signature, before upgrading the verifying parties to be able to verify the proofs. For verifying parties who choose to upgrade early, it is recommended that they include the Verify function in accordance with the classical digital signature scheme discussed hereinabove to maintain compatibility with signing parties who may not have upgraded yet.

TABLE 2

| | | Verifying Party | |
|---|---|---|---|
| | | Definition 1[1] | Definition 2[2] |
| Signing Party | Definition 1[1] | This is the "as-is" scenario. Signed documents are vulnerable to forgery in the post-quantum era. | Signed documents do not include the quantum-resistant proof. Verifying parties have the choice to either reject the document or use Verify to check the signature while informing the signing party to perform the migration. |
| | Definition 2[2] | This is the appropriate "Step 1" of the migration process. Signed documents include the quantum-resistant proof. Signing parties do not need to wait for verifying parties to migrate before carrying out this step. Verifying parties continue to verify the signature while ignoring the quantum-resistant proof | This is the "to-be" state, and the appropriate "Step 2" of the migration process. After the signing parties have migrated and started sending signed documents that include the quantum-resistant proof, the verifying parties can update their systems to verify the signature and proof to complete the migration process. |

[1]Not yet migrated. Still using Definition 1's KeyGen, Sign and Verify.
[2]Migration done. Upgraded using Definition 2's $\text{KeyGen}_q$, $\text{Sign}_q$, and $\text{Verify}_q$.

The advantages of the quantum-resistant digital signature scheme in accordance with the present embodiments are readily apparent to those skilled in the art and can instituted with today's technology. As more powerful quantum computers come online, a post-quantum deadline is looming and the benefits of the quantum-resistant digital signature scheme in accordance with the present embodiments will become necessities for secure, authenticatable communications. As a reference of post-quantum deadline, NIST has provided a report mentioning that by the year 2030, it is likely that a quantum computer capable of cryptanalyzing RSA-2048 can be built with a budget of one billion dollars. To address this, NIST is embarking on a post-quantum standardization exercise to select suitable quantum-secure digital signature and key-exchange algorithms. The final selection is expected to complete soon with the new standards slated to be published by the year 2024. Separately, NIST has also recommended two stateful hash-based signatures, namely Leighton-Micali Signatures and extended-Merkle Signature Scheme, for post-quantum use under conditions.

While the industry is likely to encourage new system implementations post-2024 to consider adopting the new digital signature standards, different challenges are expected for existing or upcoming systems.

The instinctive approach to make digital signatures quantum-secure is to use a replacement or an additional quantum-secure algorithm. NIST's post-quantum standardization exercise has currently identified two lattice-based algorithms, Dilithium and Falcon, and one multivariate-based algorithm, Rainbow, as the three finalist digital signature algorithms. Three alternative algorithms, namely multivariate-based GeMSS, zero-knowledge-based Picnic (which also uses ZKBoo, the zero-knowledge proof system discussed in implementation of the present embodiments, as the underlying proof system to create ZKB++) and stateless hash-based SPHINCS+, have been shortlisted but will undergo further evaluation beyond the year 2024 deadline. Ideally, a "drop-in replacement" in the form of a software library or hardware security module, would be used to swap out or augment RSA/DSA/ECDSA with the new algorithm being standardized. But since each of these algorithms have unique resource, performance and platform considerations, coupled with different key ceremony processes and protocols, it is more likely that a migration playbook needs to be designed and carried out.

Another approach is to use a backup key that can override the regular signing key in the event of compromise. One proposal is to use a quantum-resistant stateful hash-based W-OTS+ backup key which is created during the key generation process and can be used as a fall-back procedure in the event the original key is compromised or lost. While such backup digital signing key approaches can work as an account-recovery mechanism for authentication-related protocols, they are not suitable for routine non-interactive digital signing use-cases where longer-term non-repudiation protection of data is required.

Specific to the time-stamping use-case, the use of a sequence of hashes, chaining them in either a forward or backward direction, is a well-known approach to provide long-term, possibly quantum-secure, time-stamping which can include digital time-stamping by linking the sequence of documents to be time-stamped through a linear hash-chain or through Merkle trees. Today, blockchains such as Ethereum already support time-stamping smart contracts and a decentralized time-stamp protocol on blockchains can be provided that can prevent pre/post-dating. As these techniques typically rely on a public verifiable chain to determine a specific time of occurrence, they are not applicable as a quantum-resistant mechanism to protect digital signatures in general. Public blockchains also face privacy-related concerns since the number of transactions performed and the timings that they were transacted are publicly available.

Thus, it can be seen that the present embodiments provide a quantum-resistant digital signature scheme delivering a current solution which advantageously and efficiently addresses existing and upcoming weaknesses in secure and authenticatable communications. The quantum-resistant digital signature scheme in accordance with the present embodiments takes a different approach in implementing post-quantum digital signing. Instead of replacing or adding on a different quantum-secure digital signing algorithm, the quantum-resistant digital signature scheme in accordance with the present embodiments makes it possible to continue to use classical RSA, DSA or ECDSA digital signing algorithms while achieving longer-term quantum resistance. This is achieved by layering in a zero-knowledge proof of knowledge of the pre-image of the private key in addition to the digital signature. With the quantum-resistant digital signature scheme in accordance with the present embodiments, digital signature implementations wanting to move ahead in quantum readiness continue to maintain backward-compatibility to existing applications. This is highly advantageous since different systems may have different timelines and schedules on when the migration to quantum readiness happens, while the quantum-resistant digital signature scheme in accordance with the present embodiments is able to ensure seamless operations between upgraded and non-upgraded applications.

While application of the quantum-resistant digital signature scheme in accordance with the present embodiments discussed hereinabove in regards to an exemplary PDF document time-stamping scheme, other applications such as blockchain, Secure Email, and Transport Layer Security that can take advantage of the digital signature scheme in accordance with the present embodiments to layer in quantum resistance.

While exemplary embodiments have been presented in the foregoing detailed description of the present embodiments, it should be appreciated that a vast number of variations exist. It should further be appreciated that the exemplary embodiments are only examples, and are not intended to limit the scope, applicability, operation, or configuration of the invention in any way. Rather, the foregoing detailed description will provide those skilled in the art with a convenient road map for implementing exemplary embodiments of the invention, it being understood that various changes may be made in the function and arrangement of steps and method of operation described in the exemplary embodiments without departing from the scope of the invention as set forth in the appended claims.

What is claimed is:

1. A computer processor configured with a quantum resistant digital signature system for generating a digital signature and a layer of quantum-resistant protection, said digital signature system configured to:

receive a pre-image parameter, generate a private key using a collapsing hash function, wherein the private key is generated in response to the pre-image parameter, generate a public key, wherein the public key is associated with the private key, generate a digital signature in response to data and the private key, said data comprising a message, wherein the public key and the digital signature are generated using a digital signature algorithm vulnerable to quantum-capable adversaries; and wherein a layer of quantum-resistant protection is applied to the digital signature system and configured to generate a zero-knowledge proof of knowledge in response to the data, and send the digitally signed message to a receiver, wherein the zero-knowledge proof of knowledge is accessible by a recipient of the message;

wherein the zero-knowledge proof of knowledge comprises a zero-knowledge proof of the computation of the private key, zero-knowledge proof of the computation of the public key, and zero-knowledge proof of the computation of the digital signature starting from the pre-image parameter.

2. The computer processor in accordance with claim 1 wherein the public key and the private key are generated by a cryptographic key of a predetermined strength.

3. The computer processor in accordance with claim 1 wherein the zero-knowledge proof of knowledge is generated in response to at least a portion of the private key.

4. The computer processor in accordance with claim 1 wherein the quantum-resistant protection is configured to provide a plurality of proofs of knowledge of the pre-image of a private key, the plurality of proofs of knowledge of the pre-image of the private key having a predefined certificate hierarchy.

5. A method for quantum-resistant digitally signing data comprising:

generating a pre-image parameter in response to a security parameter;

generating a private key using a collapsing hash function, wherein the private key is generated in response to the pre-image parameter;

generating a public key, wherein the public key is associated with the private key;

generating a digital signature in response to data and the private key, said data comprising a message;

wherein generating the public key and the digital signature comprises using a digital signature algorithm vulnerable to quantum-capable adversaries;

applying a layer of quantum-resistant protection to the digital signature by generating a zero-knowledge proof of knowledge in response to the data;

wherein the zero-knowledge proof of knowledge comprises a zero-knowledge proof of the computation of the private key, zero-knowledge proof of the computation of the public key, and zero-knowledge proof of the computation of the digital signature starting from the pre-image parameter; and sending the digitally signed message to a recipient, wherein the zero-knowledge proof of knowledge is accessible by the recipient.

6. The method in accordance with claim 5 further comprising storing the signature separately from a zero-knowledge proof for parallel verification when generating the digital signature.

7. The method in accordance with claim 5 wherein the security parameter defines a cryptographic key of a predetermined strength.

8. The method in accordance with claim 5 wherein the zero-knowledge proof of knowledge is generated in response to at least a portion of the private key.

9. The method in accordance with claim 5 wherein generating the private key comprises one or more of generating the private key by performing a hash key derivation on the pre-image parameter, performing a one-way function key derivation on the pre-image parameter, or performing a symmetric key derivation on the pre-image parameter.

10. The method in accordance with claim 5 wherein generating the public key eter comprises one or more of generating the public key by performing a hash key derivation on the pre-image parameter, by performing a one-way function key derivation on the pre-image parameter, or by performing a symmetric key derivation on the pre-image parameter.

11. The method in accordance with claim 8 wherein sending the digitally signed message comprises sending the digitally signed message along with one or both of (i) the zero-knowledge proof of knowledge or (ii) location information for identifying a digital storage location from which the zero-knowledge proof of knowledge can be accessed.

12. The method in accordance with claim 8 further comprising sending the public key, wherein sending the public key comprises sending the digitally signed message along with the public key or sending the public key to a digital storage location, the digital storage location comprising a certification authority or a public repository.

13. A method for verification of a quantum resistant digital signature for authentication of a source of data by verifying a proof of knowledge of a private key and a proof of knowledge of a pre-image parameter, said data comprising a message, the method comprising:

receiving the digitally signed message, wherein the zero-knowledge proof of knowledge is accessible by a recipient of the message, authenticating the source of the data by using:

i) a public key associated with the private key, and ii) a zero-knowledge proof of knowledge as a layer of quantum-resistant protection for the digital signature, to verify a digital signature corresponding to the data is generated in response to the private key, wherein the zero-knowledge proof of knowledge comprises a zero-knowledge proof of the computation of the private key, zero-knowledge proof of the computation of the public key, and zero-knowledge proof of the computation of the digital signature starting from the pre-image parameter, wherein the public key and the digital signature was generated using a digital signature algorithm vulnerable to quantum-capable adversaries, and wherein the private key was generated using a collapsing hash function, and the private key was generated in response to the pre-image parameter.

14. The method in accordance with claim 13 wherein the authentication step comprises parallelly processing verification using the public key and verification using the zero-knowledge proof of knowledge.

15. The method in accordance with claim 14 wherein parallelly processing verification using the public key and verification using the zero-knowledge proof of knowledge comprises:

retrieving the public key from a first digital storage location; and retrieving the zero-knowledge proof of knowledge from a second digital storage location.

16. The method in accordance with claim 13 wherein authenticating the source of the data comprises accepting verification of the data if and only if both the digital signature is determined to be generated in response to the private key and the zero-knowledge proof of knowledge is determined to be a valid proof computed from the pre-image parameter.

* * * * *